(12) United States Patent
von Behren et al.

(10) Patent No.: US 8,335,921 B2
(45) Date of Patent: Dec. 18, 2012

(54) WRITING APPLICATION DATA TO A SECURE ELEMENT

(75) Inventors: Rob von Behren, Berkeley, CA (US); Jonathan Wall, San Francisco, CA (US); Ismail Cem Paya, New York, NY (US); Alexej Muehlberg, Hamburg (DE); Hauke Meyn, Krempermoor (DE)

(73) Assignee: Google, Inc., Mountain View, CA (US)

( * ) Notice: Subject to any disclaimer, the term of this patent is extended or adjusted under 35 U.S.C. 154(b) by 0 days.

(21) Appl. No.: 13/244,767

(22) Filed: Sep. 26, 2011

(65) Prior Publication Data

US 2012/0159195 A1    Jun. 21, 2012

Related U.S. Application Data

(60) Provisional application No. 61/424,606, filed on Dec. 17, 2010.

(51) Int. Cl.
*H04L 9/08* (2006.01)
*G06F 12/14* (2006.01)
*G06F 17/30* (2006.01)

(52) U.S. Cl. .......... 713/164; 713/193; 726/26; 380/278

(58) Field of Classification Search .................. 713/164
See application file for complete search history.

(56) References Cited

U.S. PATENT DOCUMENTS

| | | | |
|---|---|---|---|
| 4,851,653 A * | 7/1989 | Limisaque et al. | ........... 235/492 |
| 5,221,838 A | 6/1993 | Gutman et al. | |
| 5,321,242 A | 6/1994 | Heath, Jr. | |
| 5,787,173 A | 7/1998 | Seheidt et al. | |
| 5,872,849 A | 2/1999 | Sudia | |
| 5,991,399 A | 11/1999 | Graunke et al. | |
| 6,005,942 A | 12/1999 | Chan et al. | |
| 6,041,123 A | 3/2000 | Colvin, Sr. | |
| 6,092,201 A | 7/2000 | Turnbull et al. | |

(Continued)

FOREIGN PATENT DOCUMENTS

EP    1 004 992 A2    5/2000

(Continued)

OTHER PUBLICATIONS

AN10787 MIFARE Application Directory (MAD), NXP B.V., Jul. 7, 2010, 23 Pages.*

(Continued)

*Primary Examiner* — Matthew Henning
(74) *Attorney, Agent, or Firm* — Johnson, Marcou & Isaacs, LLC

(57) ABSTRACT

Systems, methods, computer programs, and devices are disclosed herein for partitioning the namespace of a secure element in contactless smart card devices and for writing application data in the secure element using requests from a software application outside the secure element. The secure element is a component of a contactless smart card incorporated into a contactless smart card device. A control software application resident in the same or a different secure element provides access types and access bits, for each access memory block of the secure element namespace, thereby portioning the namespace into different access types. Further, a software application outside the secure element manages the control software application by passing commands using a secure channel to the secure element, thereby enabling an end-user of the contactless smart card device or a remote computer to control the partitioning and use of software applications within the secure element.

26 Claims, 7 Drawing Sheets

U.S. PATENT DOCUMENTS

| | | | |
|---|---|---|---|
| 6,101,477 A | 8/2000 | Hohle et al. | |
| 6,141,752 A | 10/2000 | Dancs et al. | |
| 6,151,657 A | 11/2000 | Sun et al. | |
| 6,230,267 B1 | 5/2001 | Richards et al. | |
| 6,233,683 B1 | 5/2001 | Chan et al. | |
| 6,402,028 B1 | 6/2002 | Graham, Jr. et al. | |
| 6,434,238 B1 | 8/2002 | Chaum et al. | |
| 6,484,174 B1 | 11/2002 | Wall et al. | |
| 6,601,761 B1 | 8/2003 | Katis | |
| 6,609,113 B1 | 8/2003 | O'Leary et al. | |
| 6,633,984 B2 | 10/2003 | Susser et al. | |
| 6,647,260 B2 | 11/2003 | Dusse et al. | |
| 6,792,536 B1 | 9/2004 | Teppler | |
| 6,823,520 B1 | 11/2004 | Susser et al. | |
| 6,907,608 B1 | 6/2005 | Susser et al. | |
| 6,922,835 B1 | 7/2005 | Susser et al. | |
| 6,963,270 B1 | 11/2005 | Gallagher, III et al. | |
| 7,093,122 B1 | 8/2006 | Susser et al. | |
| 7,140,549 B2 | 11/2006 | de Jong | |
| 7,152,782 B2 | 12/2006 | Shenker et al. | |
| 7,159,180 B2 | 1/2007 | Ward | |
| 7,165,727 B2 | 1/2007 | de Jong | |
| 7,191,288 B2 | 3/2007 | de Jong | |
| 7,206,769 B2 | 4/2007 | Laurent et al. | |
| 7,232,073 B1 | 6/2007 | de Jong | |
| 7,243,853 B1 | 7/2007 | Levy et al. | |
| 7,275,685 B2 | 10/2007 | Gray et al. | |
| 7,346,170 B2 | 3/2008 | Asano et al. | |
| 7,349,885 B2 | 3/2008 | Gangi | |
| 7,353,396 B2 | 4/2008 | Micali et al. | |
| 7,360,691 B2 | 4/2008 | Takayama | |
| 7,374,099 B2 | 5/2008 | de Jong | |
| 7,382,762 B2 | 6/2008 | Chmora et al. | |
| 7,392,378 B1 | 6/2008 | Elliott | |
| 7,395,535 B2 | 7/2008 | Susser et al. | |
| 7,469,151 B2 | 12/2008 | Khan et al. | |
| 7,478,389 B2 | 1/2009 | Susser et al. | |
| 7,502,946 B2 | 3/2009 | Perkins et al. | |
| 7,607,175 B2 | 10/2009 | Susser et al. | |
| 7,631,346 B2 | 12/2009 | Hinton et al. | |
| 7,631,810 B2 | 12/2009 | Liu et al. | |
| 7,708,198 B2 | 5/2010 | Gangi | |
| 7,712,658 B2 | 5/2010 | Gangi | |
| 7,739,731 B2 | 6/2010 | Violleau et al. | |
| 7,860,486 B2 | 12/2010 | Frank et al. | |
| 7,967,215 B2 | 6/2011 | Kumar et al. | |
| 8,120,460 B1 | 2/2012 | Zhu | |
| 8,126,806 B1 | 2/2012 | DiMartino et al. | |
| 8,150,767 B2 | 4/2012 | Wankmueller | |
| 8,171,137 B1 | 5/2012 | Parks et al. | |
| 8,171,525 B1 | 5/2012 | Pelly et al. | |
| 8,196,131 B1 | 6/2012 | von Behren et al. | |
| 2001/0021927 A1 | 9/2001 | Laurent et al. | |
| 2001/0027441 A1 | 10/2001 | Wankmueller | |
| 2001/0039657 A1 | 11/2001 | Fopeano et al. | |
| 2002/0004783 A1 | 1/2002 | Paltenghe et al. | |
| 2002/0042776 A1 | 4/2002 | Woo et al. | |
| 2002/0068554 A1 | 6/2002 | Dusse | |
| 2002/0194138 A1 | 12/2002 | Dominguez et al. | |
| 2003/0023954 A1 | 1/2003 | Wilkinson et al. | |
| 2003/0074579 A1 | 4/2003 | Della-Libera et al. | |
| 2003/0140176 A1 | 7/2003 | Susser et al. | |
| 2004/0029569 A1 | 2/2004 | Khan et al. | |
| 2004/0030601 A1 | 2/2004 | Pond et al. | |
| 2004/0123152 A1 | 6/2004 | Le Saint | |
| 2004/0128259 A1 | 7/2004 | Blakeley et al. | |
| 2004/0140351 A1 | 7/2004 | Flugge et al. | |
| 2005/0001711 A1 | 1/2005 | Doughty et al. | |
| 2005/0071418 A1 | 3/2005 | Kjellberg et al. | |
| 2005/0091659 A1 | 4/2005 | Susser et al. | |
| 2005/0102679 A1 | 5/2005 | Susser et al. | |
| 2005/0149926 A1 | 7/2005 | Saltz | |
| 2005/0184163 A1 | 8/2005 | de Jong | |
| 2005/0184164 A1 | 8/2005 | de Jong | |
| 2005/0184165 A1 | 8/2005 | de Jong | |
| 2005/0188360 A1 | 8/2005 | De Jong | |
| 2005/0193218 A1 | 9/2005 | Susser et al. | |
| 2005/0222961 A1 | 10/2005 | Staib et al. | |
| 2006/0036570 A1 | 2/2006 | Schaefer et al. | |
| 2006/0041507 A1 | 2/2006 | Novack et al. | |
| 2006/0126831 A1 | 6/2006 | Cerruti et al. | |
| 2006/0165060 A1 | 7/2006 | Dua | |
| 2006/0219774 A1 | 10/2006 | Benco et al. | |
| 2007/0067325 A1 | 3/2007 | Weitzner et al. | |
| 2007/0090195 A1 | 4/2007 | Kawamura et al. | |
| 2007/0135164 A1 | 6/2007 | Lee | |
| 2007/0169043 A1 | 7/2007 | Violleau et al. | |
| 2007/0226786 A1 | 9/2007 | Berger et al. | |
| 2008/0056501 A1 | 3/2008 | McGough et al. | |
| 2008/0073426 A1 | 3/2008 | Koh et al. | |
| 2008/0130902 A1 | 6/2008 | Foo Kune et al. | |
| 2008/0162834 A1* | 7/2008 | Brokenshire et al. | 711/154 |
| 2008/0167988 A1 | 7/2008 | Sun et al. | |
| 2008/0208681 A1 | 8/2008 | Hammad et al. | |
| 2008/0208762 A1 | 8/2008 | Arthur et al. | |
| 2008/0270253 A1 | 10/2008 | Huang | |
| 2009/0158028 A1 | 6/2009 | Jung et al. | |
| 2009/0239512 A1 | 9/2009 | Hammad et al. | |
| 2009/0261172 A1* | 10/2009 | Kumar et al. | 235/492 |
| 2009/0307142 A1 | 12/2009 | Mardikar | |
| 2009/0312011 A1 | 12/2009 | Huomo et al. | |
| 2010/0012732 A1 | 1/2010 | Pinzinger et al. | |
| 2010/0042824 A1 | 2/2010 | Lee et al. | |
| 2010/0050271 A1 | 2/2010 | Saarisalo | |
| 2010/0058463 A1 | 3/2010 | Bertin | |
| 2010/0063893 A1 | 3/2010 | Townsend | |
| 2010/0088237 A1 | 4/2010 | Wankmueller | |
| 2010/0114731 A1 | 5/2010 | Kingston et al. | |
| 2010/0131413 A1 | 5/2010 | Kranzley et al. | |
| 2010/0138518 A1* | 6/2010 | Aiglstorfer et al. | 709/219 |
| 2010/0203870 A1 | 8/2010 | Hubinak et al. | |
| 2010/0205432 A1 | 8/2010 | Corda et al. | |
| 2010/0207742 A1 | 8/2010 | Buhot et al. | |
| 2010/0211507 A1 | 8/2010 | Aabye et al. | |
| 2010/0291896 A1* | 11/2010 | Corda | 455/410 |
| 2010/0291904 A1 | 11/2010 | Musfeldt et al. | |
| 2010/0306076 A1 | 12/2010 | Taveau et al. | |
| 2010/0306107 A1 | 12/2010 | Nahari | |
| 2010/0306531 A1 | 12/2010 | Nahari | |
| 2010/0323681 A1 | 12/2010 | Corda et al. | |
| 2010/0330958 A1 | 12/2010 | Corda et al. | |
| 2011/0016275 A1 | 1/2011 | Lemonnier et al. | |
| 2011/0029671 A1 | 2/2011 | Deprun et al. | |
| 2011/0053504 A1* | 3/2011 | Corda | 455/41.1 |
| 2011/0072425 A1 | 3/2011 | Lemonnier et al. | |
| 2011/0078081 A1 | 3/2011 | Pirzadeh et al. | |
| 2011/0087610 A1 | 4/2011 | Batada et al. | |
| 2011/0113473 A1 | 5/2011 | Corda et al. | |
| 2011/0131421 A1 | 6/2011 | Jogand-Coulomb et al. | |
| 2012/0009873 A1 | 1/2012 | Corda et al. | |
| 2012/0129452 A1 | 5/2012 | Koh et al. | |

FOREIGN PATENT DOCUMENTS

| | | |
|---|---|---|
| EP | 1 318 488 A2 | 6/2003 |
| EP | 2 043 060 A1 | 4/2009 |
| GB | 2457221 A | 8/2009 |
| WO | WO 98/52158 A2 | 11/1998 |
| WO | 01/22374 A1 | 3/2001 |
| WO | 2004/054125 A1 | 6/2004 |

OTHER PUBLICATIONS

"EPC—GSMA Trusted Service Manager Service Management Requirements and Specifications", retrieved from http://www.europeanpaymentscouncil.eu/documents/EPC220-.

Boly, J.P. et al., "The ESPIRIT Project Cafe—High Security Digital Payment Systems," ESCORICS 94 (Third European Symposium on Research in Computer Security), LNCS 875, 1994, pp. 217-230, Springer-Verlag, Berlin.

Chen, Z., "How to Write a Java Card Applet: A Developers Guide," JavaWorld.com, Jul. 1, 1999.

Corum, C., Editor, "Santa Clara Puts Payments in 'Palm' of Your Hand: Palms and Cellphones Initiate Payments to Campus Card System," CR80News.com, May 2003, vol. 2, No. 5.

Daswani, N. et al., "SWAPEROO: A Simple Wallet Architecture for Payments, Exchanges, Refunds, and Other Operations," Proceedings of the 3rd USENIX Workshop on Electronic Commerce, Aug. 31-Sep. 3, 1998, Boston, Massachusetts.

Dotzer, F., "Aspects of Multi-Application Smart Card Management Systems," Thesis at the Lehrstuhl für Dateoverarbeitung (LDV) (Institute of Data Processing), Munchen Technical University, Oct. 15, 2002.

Hernandez, R., "E-Wallet with Decentralized Credential Keepers," Master Thesis for Institutt for Telematikk, Jun. 30, 2003.

Hernandez, R., "E-Wallet Software Architecture and Decentralized Credentials," Norsk Informatikkonferancse (NIK), 2003.

Huang, P. et al., Future Personal 'E-Payment': IrFM, IEEE Wireless Communications, Feb. 2006.

Mjolsnes, S., "On-Line E-Wallet System with Decentralized Credential Keepers," Mobile Networks and Applications 8, 87-99, 2003, Kluwer Academic Publishers.

The Smart Card Alliance, "Mobile Payments at the Physical Point-of-Sale: Assessing U.S. Market Drivers and Industry Direction", Pub. No. PT-05001, Apr. 2005.

Yun, S. et al., "Design and Implementation of Wireless Payment System Using GVM and MobileC," Proceedings of the International Conference on Mobile Computing and Ubiquitous Networking, 2005, pp. 1-10, vol. 1.

"Global Platform: Contactless Services, Card Specification v2.2," Version 1.0, Feb. 2010, GlobalPlatform Inc.

U.S. Appl. No. 60/338,419, filed Dec. 4, 2001, Merckling et al.

Office Action dated Dec. 6, 2011, issued in a co-pending U.S. Appl. No. 13/244,781, filed Sep. 26, 2011.

"The Role of the TSM," The Review, Winter 2008, Gemalto N. V., p. 7.

Yin, "Google Wallet Aims to Make Mobile Payments Mainstream," May 26, 2011, PCmag.com.

Yin, "Google Wallet is Just Another Pilot, Says World's Largest SIM Card Maker, " May 27, 2011, PCmag.com.

Yliuntinen, "$3^{rd}$ party TSM Management of SIM Cards," Sep. 2011, Cryptomathic.

Xu et al., "Design of Objects Sharing Mechanism with Security Domain in Java Smart Card," Electronic Computer Technology, 2009 International Conference.

"Runtime Environment Specification, Java Card™ Platform, Version 3.0, Classic Edition," Mar. 2008, Sun Microsystems, Inc.

Anonymous, "MIFARE Standard Card IC MF1 IC S50 Function Specification," Philips Semiconductors, Product Specification, No. Revision 4.0, XP002537152, Jul. 1, 1998, pp. 1-18.

Smart-card Devices and Applications, pp. 1-13, Jan. 1, 2001.

Berthon, Claude, International Search Report and Written Opinion for International Patent Application No. PCT/US2011/065557, pp. 1-9, Mar. 19, 2012.

Gatinet, Bruno, International Search Report and Written Opinion for International Patent Application No. PCT/US2011/065550, pp. 1-11, Apr. 20, 2012.

U.S. Appl. No. 13/360,618, filed Jan. 27, 2012.

U.S. Appl. No. 13/443,671, filed Apr. 10, 2012.

U.S. Appl. No. 13/547,029, filed Jul. 11, 2012.

U.S. Appl. No. 13/523,637, filed Jun. 14, 2012.

* cited by examiner

300A

| Sector 308 | Memory Block 312 | Secure element namespace/ Installed software application memory 304 — Bytes per block 316 → | | | | | | |
|---|---|---|---|---|---|---|---|---|
| | | 0 | 1 | 2 | .... | .... | 13 | 14 | 15 |
| 15 | 3 | A Key 320A Data Memory Block 332A | | | Access Memory Block 328A Data Memory Block 332A Data Memory Block 332B Data Memory Block 332C | | B Key 324A | | |
| | 2 | | | | | | | | |
| | 1 | | | | | | | | |
| | 0 | | | | | | | | |
| 14 | 3 | A Key 320B | | | Access Memory Block 328B Data Memory Block 332A | | B Key 324B Data Memory Block 332A | | |
| | 2 | | | | | | | | |
| | 1 | | | | | | | | |
| | 0 | | | | | | | | |
| . | . | A Key 320C | | | Access Memory Block 328C Data Memory Block 332A | | B Key 324C | | |
| 2 | 3 | A Key 320X | | | Access Memory Block 328X Data Memory Block 332A | | B Key 324X | | |
| | 2 | | | | | | | | |
| | 1 | | | | | | | | |
| | 0 | | | | | | | | |
| 1 | 3 | A Key 320Y | | | Access Memory Block 328Y Data Memory Block 332A | | B Key 324Y | | |
| | 2 | | | | | | | | |
| | 1 | | | | | | | | |
| | 0 | | | | | | | | |
| 0 | 3 | A Key 320Z | | | Access Memory Block 328Z Data Memory Block – Directory 332A | | B Key 324Z | | |
| | 2 | | | | | | | | |
| | 1 | | | | | | | | |
| | 0 | | | | Manufacture's Block 336 | | | | |

300B

| Control Software Application 340 | | | | | | |
|---|---|---|---|---|---|---|
| Sector No. | Access Key Stored 344 | Access Condition Stored 348 | Sector type 352 | AID 356 | Change log 360 | . . |
| 15 | A Key 320A | Access Bits from Block 328A | Initial Value SSLOT | . | . | . . |
| 15 | B Key 324A | Access Bits from Block 328A | Read/Write SSLOT | . | . | . . |
| 14 | A Key 320B | . | Increment/ Decrement RSLOT | . | . | . . |
| . | . | . | . | . | . | . . |
| 0 | . | . | Directory | . | . | . . |

| Access Conditions 704 |||
|---|---|---|
| Read Access Type 708 | Write Access Type 712 | Sector or Memory Block to Edit/Change 716 |
| Key $A_1$ 720 | Key $A_1\|B_1$ 724 | Change Exit/Entry Related Sector 728 |
| Key $A_2$ 732 | Key $B_2$ 736 | Change Initial Value Sector 740 |
| Key $A_2\|B_2$ 744 | Key $A_2\|B_2$ 748 | Change Key $A_2$ 752 |
| Key $A_2\|B_2$ 756 | Key $B_2$ 760 | Change Key $B_2$ 764 |
| Key $A_2\|B_2$ 768 | Key $B_2$ 772 | Change access bits for a selected sector 776 |

Fig. 7

WRITING APPLICATION DATA TO A SECURE ELEMENT

RELATED APPLICATIONS

This application claims priority to U.S. Provisional Patent Application No. 61/424,606, filed Dec. 17, 2010 and entitled "Systems and Methods for Managing, Provisioning, and Encrypting Information in a Contactless Payment Device." The entire contents of the above-identified priority application are hereby fully incorporated herein by reference.

TECHNICAL FIELD

The present disclosure relates generally to computer-implemented systems, methods, and devices for partitioning the namespace of a secure element in contactless smart card devices and for writing application data in the secure element using requests from a software application outside the secure element.

BACKGROUND

Contactless transaction systems use secure contactless smart cards for transaction purposes. Certain exemplary transaction systems include transportation—transit cards, authentication and identity cards, parking cards, and phone cards. An exemplary secure contactless smart card is the MIFARE® card from NXP Semiconductors or an iClass® card from HID Global. Certain conventional smart cards use radio frequency identification (RFID) standards to transmit and receive information to and from a card reader device. RFID based contactless smart card devices are supported via the International Organization for Standardization and the International Electrotechnical Commission standard (ISO/IEC) 14443 for smart cards and card readers. Certain contactless card type devices are enabled using electronic components, such as an antenna and secure memory, and supporting semiconductor components, such as a memory management unit, a processor, and a cryptographic generator.

The different types of software application or application data memory areas include random access memory (RAM), read only memory (ROM), and non-volatile flash memory. These memory areas are typically secure memory areas and store all the secure information required to operate software applications for access, membership, or payment purposes. Certain low end contactless smart cards may not offer significant processing capabilities; these smart cards are often passive and transmit a radio frequency with information from a passive memory. Further, each secure memory area is assigned specific application functions, which are included in the secure element area within the contactless smart card.

Certain contactless smart cards include a platform for hardware and software that supports both EMV (electronic credit card standards) and MIFARE® operating functions. Such cards further include a processor for retaining different areas within combined or separated secure elements of the contactless smart card device. Contactless smart cards are available in different memory sizes, for example, a 4 KB of EEPROM (flash memory) or a 1 KB EEPROM package. However, certain widely used smart cards do not have any intelligent processing capability and are software coded such that certain memory areas alone can be read only by certain card readers. In many widely used contactless transaction cards, such as the MIFARE Classic®, a limited amount of resources are available within the smart card to enable further development. For example, on a 4 KB card, a requirement exists that all of the 4 KB should be active within the card at any given time.

In some secure element namespaces, also referred to as "memory areas" within contactless cards, the available memory is statically partitioned, and the partitions are further encoded in the card reader. Eventually, the card reader reads only from the pre-determined partitions. This division of an already over-subscribed namespace results in frequent collisions, and therefore, anti-collision protocols that further reduce available memory space. Further, limited security protocols are enforced for cards that do not have any processor capabilities. This enforcement may reduce the security options within the card and the card readers compared to, for example, EMV type cards that are commonly used for credit card applications.

Some software applications may limit information stored within the card, as well as the control of the information to owners of the secure keys. On a contactless smart card that includes multiple applications, conflicts and errors arise as a result of shared memory. Further, if the second company needs to protect a part of the data on the card, this protection will not be possible as one key does not offer security overriding another key. The limited application space, data space, and security with multi-party interests are deficient in the current application. Further, the access keys on the card cannot be updated without permission of key "B" owners.

SUMMARY

In certain exemplary embodiments, a computer-implemented method for partitioning the namespace of a secure element into at least two storage types by a control software application within the secure element comprises defining, in the control software application, at least first access type, a second access type, a first access key, and a second access key for a plurality of memory blocks within the secure element namespace, wherein each of the first access key and the second access key provides one of the first access type, the second access type, or a combination of the first and the second access types to the plurality of memory blocks within the secure element namespace; selecting, by the control software application, from the plurality of memory blocks within the secure element namespace, at least a first group of memory blocks, a second group of memory blocks, and access types for each of the selected groups of memory blocks, wherein at least one memory block in each selected groups of memory blocks is an access memory block for providing the selected access type of the software application or application data within data memory blocks of the selected groups of memory blocks to an external data requesting device; and transmitting, from the control software application, for storage in the access memory block for each of the selected groups of memory blocks, the first access key, the second access key, and the selected access types for each respective selected groups of memory blocks, thereby partitioning the namespace of the secure element into at least two storage types.

In certain exemplary embodiments, a computer-implemented method for writing application data in a secure element namespace using a user-interface software application resident outside the secure element comprises transmitting, from the user-interface software application, to a remote trusted service manager (TSM) computer, a request for application data, and at least an access key for a write access type, the application data to be written to the secure element namespace; receiving, in a secure memory, from the remote TSM computer, the requested application data, and the requested access key; and writing, by a control software application in the secure element, the requested application data from the secure memory to a data memory block of the secure element namespace, wherein the data memory block of the secure element namespace is accessed by the control software application using the requested access key.

BRIEF DESCRIPTION OF THE DRAWINGS

FIG. 3 illustrates a data structure for the namespace of a secure element in contactless smart card devices and the application data associated with the control software application which controls the partitioning and storage of application data in the secure element namespace according to certain exemplary embodiments.

FIG. 7 illustrates a computer-implemented method of controlling access to the secure element namespace for partitioning and provisioning purposes according to certain exemplary embodiments.

DETAILED DESCRIPTION OF EXEMPLARY EMBODIMENTS

Figure 1:
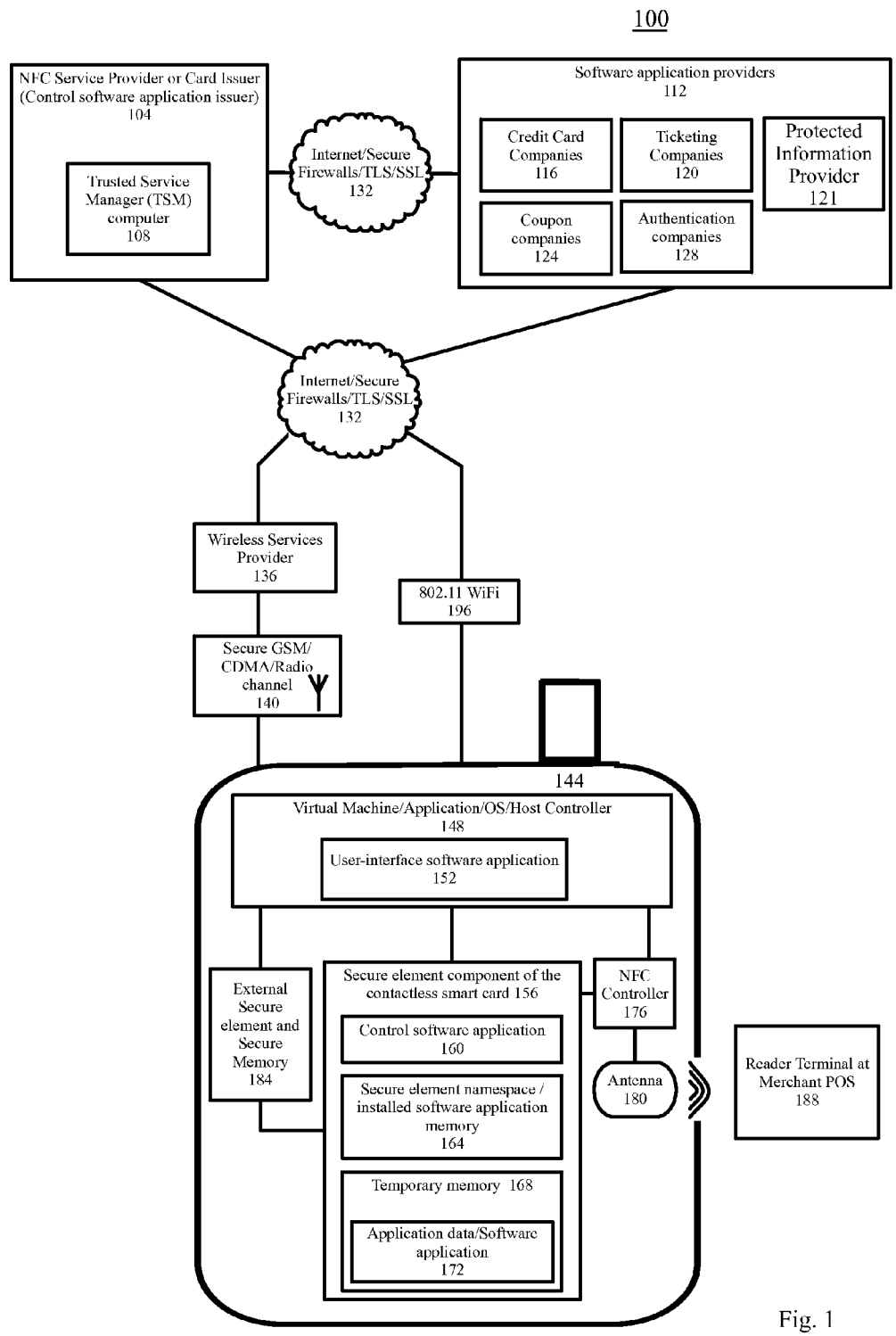
FIG. 1 illustrates a computer-implemented system and device for partitioning the namespace of a secure element in contactless smart card devices and for writing application data in the secure element using requests from a software application outside the secure element according to certain exemplary embodiments.

An application directory table reserves special blocks in the secure element namespace as metadata blocks. These blocks contain the logical mapping of application identifiers (AIDs) to the slot/block that contains the software application to be presented to an external card reader device. When the external card reader device encounters a contactless smart card, it tries to authenticate to the special metadata block identified in the directory with a defined access key known to the card reader and the software application. When the block is valid, the card reader reads the contents of the application directory table in the assigned block, and performs a look-up to find which sector/blocks to which the application ID is mapped. By way of an example, when a retailer's loyalty card has an AID of '10,' a targeted card reader device would read the application directory table in the data memory block of the secure element namespace and lookup the AID '10.' While the directory service is a useful service, it requires the complete use of the block and its AID namespace and is managed externally by a third party.

The application identifier (AID) within the contactless smart card is a 16 bit code divided into a function cluster and an application code, each of 8 bit length. Key "A" or the "A Key" of sector 0 is a public sector with a 6 byte code, while key "B" or the "B Key" of sector 0 is determined by the contactless smart card issuer or card owner, where the card issuer controls certain access keys and a control software application or certain aspects of the other software applications on the contactless smart card.

"Card issuer" or "card owner" are terms used interchangeably herein, and generally refer to the entity that places the secure element and the application directory within the contactless smart card. An NFC service provider may be an example of a card issuer type entity.

The B Key may be a 6 byte code that is kept private for making changes to the software application or the application data within the related memory block.

"Application data" as used herein defines the data that augments, updates, or provides data to a software application. "Software application" as used herein refers to any software application obtained in any format from an external computer that can be installed and executed within the secure element of the contactless smart card. Further, "software application" and "application data" are used interchangeably herein to refer to the types of data stored within the secure element from an external computer. The term "software application" also includes all formats of the software application, from the downloaded format, any intermediate format, and the final executed format, unless otherwise described.

In the data memory block for the application directory table in the secure element namespace, a software application is mapped using its 2 byte Application identifier (AID) by using a single byte cluster code for access control and another single byte as a software application code or the least significant bit (LSB).

In certain exemplary embodiments, certain contactless smart cards or implementations of a contactless smart card, the secure element namespace can be divided into different partitions for different card types, including different card protocols or platforms, for example, EMVCo on JavaCard platform, near field communication (NFC) for proximity sensing, or MIFARE. In one embodiment, the secure element namespace is virtually divided into sectors, where each sector includes 4 memory blocks that are each 16 bytes in length, with the options for sector sizing different from the default of the 16 bytes. The trailing block of each sector is a dedicated access memory block that is divided into the 3 memory sections for storage of access information to the remainder of the memory block. The access information includes an A Key, access bits within the access memory block, and a B Key. The access memory block controls access to the rest of the blocks in the sector depending on individual access keys or a combination of the access keys that are used to access the memory blocks. The remainder of the memory blocks in a sector is data memory blocks that contain application data or the software application. Software applications also can be stored across sectors by providing a pointer or continuity information to the ending bytes of the software application in a previous sector. The pointer may include the AID of the software application and the block location and sector location of the continuing section of the software application.

In certain exemplary embodiments, the access keys in the access memory block support different access types to the data memory block for the application data and the application directory table in sector 0. The access control block can be configured to describe the permissions of key A, while key B maintains the ability to rotate keys in the control block and to overwrite the access bits within the access control block. In the data memory block of sector 0, including the application directory table, key B may be used to edit the directory, to change the mapping of AIDs to sector and memory block locations, and to reallocate the memory blocks by changing the access type in the secure element namespace. These functionalities allow the contactless smart card to functionally support multiple applications and access types, depending on the access keys and the access bits in the access memory block. Access types that may be available to the contactless smart card include a write access, a read access, an increment access, a decrement access, or a combination of two or more of each of the read, write, increment, and decrement accesses. The write access includes the ability to write or install software applications or application data to data memory blocks within the secure element namespace.

Each of the sectors in the secure element namespace is assigned a unique identifier from which the device keysets are derived, where the unique identifier may be assigned to the contactless smart card at manufacture or by a card owner. The card owner may refer to the entity that deploys a secure element and the application directory structure on to the contactless smart card. By way of an example, a Services Identity Module (SIM), a secure digital (SD) memory card, or a Universal Integrated Circuit Card (UICC) manufacturer may be a card owner by embedding the secure element and application directory structure into the SIM, UICC, or SD card prior to selling it to a wireless service provider for deployment in a smart phone. Alternatively, a wireless service provider for a Global System for Mobile Communications (GSM), Universal Mobile Telecommunications System (UMTS), or Code Division Multiple Access (CDMA) may embed the secure element and create the application directory prior to selling the cards for enabling mobile communications.

Each of the "card manufacturer," the "card owner," or the "wireless service provider," may be referred to as a "card issuer" for providing the secure element and support application directory within the contactless smart card. In an exemplary embodiment, the term "card issuer" also may refer to service providers that create and deploy the control software application within the secure element of the contactless smart card, where the control software application can be used to control, initiate, and partition the secure element namespace. The application directory may be considered as an embedded software application at the embedding stage.

In certain exemplary embodiments, a contactless smart card device manufacturer or a contactless smart card device operating system developer may be considered to be the card issuer. The card issuer may, independently or in cooperation with the card owner, provide one or more additional software applications within the contactless smart card, via the secure element or an external secure element. The additional software application may perform a management role among a number of card protocols within the contactless smart card device using a single NFC controller and antenna, or may control the secure element namespace of the contactless smart card. Further, a software application provider provides software applications via over-the-air methods, using the card issuer's services or though regular wireless Internet using the 802.11 standards.

Each sector of the secure element can, as a part of the application directory structure, store a single application with an application identification (AID), thereby enabling multiple software applications to co-exist within the contactless smart card. One memory block at sector address 0, may contain only the manufacturer's data, while the other memory blocks are data memory blocks that include AIDs of unique applications on the card and the access memory block which provides access to the application directory table. The manufacturer's data is used to trace the integrated circuit (IC) details in case of quality problems. So, sector 0 of the secure element namespace contains 2 data blocks of 16 bytes each, which is commonly the AID information of applications located in other memory blocks within the contactless smart card.

In certain exemplary embodiments, a contactless smart card device incorporates the contactless smart card and provides a user-interface software application access to the contactless smart card. Exemplary contactless smart card devices include smart phones; mobile phones; PDAs; mobile computing devices such as netbooks and iPad®s; electronically enabled key fobs; electronically enabled card type devices; and other electronically enabled devices, where each device can be used for a plurality of purposes including, but not limited to, financial transactions, coupons, ticketing, secure authentication, and related applications.

In certain exemplary embodiments, a software application on a contactless smart card in the context of a transit environment application allows a card reader to access the memory blocks of certain sectors to record where the transit system was entered or exited, to set initial values, and to decrement values on the card. The turnstile may be limited to access key A, which is a lower security key and authenticates the card reader turnstile to read card values and write the exit or entry point in a certain block of the contactless smart card, depending on the access memory block assignment on the card. Accordingly, the transit software application may be stored in a certain block with references to other sectors for value—increment/decrement and for station—exit/entered, where the decrement value may be calculated from the station value allocation in the corresponding data memory block. Each sector may include a different set of Key A and Key B, where appropriate.

The software application's provider, for example, a transit office, has access to key B for the initial value settings in a different sector and memory block of the contactless smart card, where the sector allows for writing using the key B. Accordingly, the card may be configured to allow key B accessible devices to write the initial value to a pre-determined "initial value" data memory block or sector of the contactless smart card. A different data memory block of a sector for storing "station information" includes a different set of access keys, key A and key B, which allow the station information entry and exit to be registered. A value of charge is calculated between the entry and exit stations and is then applied to the "initial value" data memory block or sector of the contactless smart card when the card user exists at a station. The transit system verifies key A for the "initial value" data memory block or sector for reading the value remaining prior to allowing entry. A different key B writes the entry location into the station information data memory block allocated and protected by the key B. When the turnstile is exited, the card is notified, and the fare is calculated from the exit and entry points and is decremented from the initial value, while wiping the initial location. Alternatively, when the decrement value is greater than the initial value, the card will signal the turnstile to prevent exit. Adding more value to the card using key B for access via a ticket machine or at an office will rectify the problem.

Contactless smart cards can be manufactured with known default keys (for example, 0×FF is a typical default key) for initialization purposes. Since the default keys are known, the security element embedded on the contactless smart card or within the contactless smart card device may be considered as disabled, which implies that access may be prevented via the contactless interface (external card readers) or a contact interface, such as, applications programming interface (API) or a different software application within the secure element. The APIs may be supported by the runtime environment of the secure element or the contactless smart card device that hosts the secure element. Once the keys in the sector are designated by the initial setting device at the card manufacture's location or the card issuer's (or owner) location using a set of access keys, a main access key, key B, will have exclusive management access to the sector with any option for overrides. Accordingly, the rotation or changing of the keys is set into a known state to preserve control of the memory blocks. Messages, software application, or application data within the memory blocks are generally in plaintext format, while the encrypted message (encrypted by the applicable keys—A or B) is in a ciphertext format. Key B may be used to change Key A in certain sectors, as well as the access bits associated with the key may be changed for certain sectors.

In certain exemplary embodiments, the card reader terminal or device reads the contactless smart card by browsing through the secure element memory for the relevant application directory, and then scanning the AIDs for a pre-determined software application AID or a pre-determined sector as specified in the card reader. An application directory (AD) can establish a data structure table for directory and application entries, thereby enabling the reader to identify the correct software applications with which to being transactions. The contactless smart card can be seen as a memory storage area, as the card reader will request application data from the memory storage area for processing such applications as payment or even transit. The contactless smart card typically provides a random number challenge to the card reader, while the card reader provides its own response, using a mutual secret key, back to the contactless smart card. The contactless smart card then verifies the response from the card reader by comparing its random number to ensure the same secret key. Thereafter the actual transaction is processed using the encryption secret key that is mutually agreed upon.

In certain exemplary embodiments, the transit software application in a contactless smart card may include multiple software applications or for different regions or purposes. By way of an example, a New York Transit system and a Los Angles Transit system may provide different software applications to a single contactless smart card within a contactless smart card device. The two software applications can be used on terminals in the corresponding locations as the corresponding card readers can automatically determine which directory to access by checking the AD. The information or the application directory data in the directory part of the data memory block provides the reference section of the AD, and includes pointers to the card issuer or a manufacturer's sector for information on the distribution of the remaining free card sectors where the software applications are allocated.

In certain exemplary embodiments, the secure element namespace is partitioned into two storage types by a control software application installed within the secure element namespace. The control software application may be installed within a physically or virtually different secure element namespace, where the physically different secure element namespace includes a secure communication channel with the secure element namespace of the memory block and sector structure disclosed herein. By way of an example, the control software application may be a JavaCard applet executing on a JavaCard Virtual Machine within a different secure element namespace in the contactless smart card device incorporating the contactless smart card. Accordingly, the JavaCard applet may control the deployment of access keys, software applications, application data, the application directory, and the access bits in the access memory blocks using APIs and interacting with the secure element of the contactless smart card via a secure communication channel.

In certain exemplary embodiments, the secure element namespace is partitioned into a sold memory block or a sold slot (SSLOT) and a rented memory block or a rented slot (RSLOT). Further, the SSLOT or the RSLOT may be a group of memory blocks that form the sector, or a group of memory blocks across multiple sectors. The SSLOT is a sold slot and may be contractually sold by a contactless smart card manufacturer to a card issuer. The card issuer then deploys software applications that are owned by a software application provider into the card for an end-user to use. By way of an example, a phone service provider may perform the role of the contactless smart card manufacturer while issuing a SIM or a UICC card, where the SIM or UICC card includes the secure element. The RSLOT is a slot that may be rented to the second party card user. The software application provider is an organization that utilizes custom applications within the card for such operations as financial transactions, secure authentication, ticketing, or coupons. The card issuer sets the applications and values within the allocated rented or sold SLOTs and assigns a card reader to make changes to the values within the applications in the card.

In certain exemplary embodiments, the allocation of slots is determined by the allocation of sectors, access bits, and access keys. For example, the RSLOT can comprise rented sectors and memory blocks in the secure element namespace, rented to a to a software application provider, along with key A authentication and associated access bits for the rented sectors and memory blocks. Alternatively, multiple software application providers may partner together or may individually prefer to maintain full control of their data and life-cycle management mechanisms on their software applications and application data, wherein the complete control of the life-cycle, from download and installation to use and update is controlled using key B provided by the card issuer. An exemplary application in such a scenario is a disconnected refill station for adding card value for a transit card; this process may need key B to access sensitive data memory blocks in certain sectors of the contactless smart card. To satisfy the demands of these software application providers, the card issuer also can share SSLOT access keys with the software application provider.

In certain exemplary embodiments, an SSLOT (sold slot) portion of the namespace may be fully surrendered to a second party, where the SSLOT portion includes key B for select sectors in the secure element namespace. Further, SSLOT for the entire secure element namespace may be provided to the software application provider by providing the same access keys for all the sectors in the contactless smart card. While yielding control of an SSLOT, the card issuer allows a service provider to access both key B and key A for the SLOT. As part of the SSLOT contract, the second party may not rotate key B without the explicit consent of the control software application (or a JavaCard based control applet) located within the secure element. The control software application is owned and deployed in the secure element by the card issuer. The intent of this arrangement is to allow the control applet to dynamically swap SSLOTS in and out of the sector per the requirements of the software applications provider. Further, when an end-user installs multiple software applications in the contactless smart card device incorporating the contactless smart card, the end-user will be provided with an option to activate certain software applications for transaction purposes, even when the secure element namespace is crowded. In an exemplary embodiment, an external secure memory may be used as a temporary memory for loading software applications that are inactive. The external secure memory may also be incorporated within the existing secure element with a different directory structure, inaccessible to external card reader devices.

In certain exemplary embodiments, the contract between the card issuer and the software application provider who may be a second party partner of the card issuer is a contract based on a service level agreement (SLA) and business rules between the card issuer and the software application provider. The SLA defines the limitations, the transactions, and the processes that arise from the sharing of access keys to enable the SLOT transfer automatically or manually. The external rotation of keys B in the block (in other words, contactless interaction) may depend on the stipulations in the SLA. Any violation of the SLA would imply an absence of technical means to reclaim the sold portion of the namespace. This function distinguishes SSLOTS and RSLOTS. Because the SSLOT surrenders critical control to the second party partner, the sharing may be enforced via the SLA to highly valued and trusted partners.

To make the most of the limited secure element namespace, the card issuer can "sell" as few slots as possible, while reserving as much of the namespace as possible for RSLOTs. To best utilize the reserved RSLOTs, in certain exemplary embodiments, the card issuer uses a system that allows dynamic mapping (instead of statically partitioning) of the RSLOTs. The intent of the card issuer is to make the RSLOT namespace directly manageable by a wallet software application or a user-interface software application on the contactless smart card device that interacts with the control software application in the secure element of the contactless smart card incorporated in the device. By way of an example, an end-user, on a contactless NFC enabled mobile phone, uses the wallet software application to interact with the control applet within the smart card, thereby enabling the end-user to control certain aspects in a multi-application environment in the crowded secure element namespace.

When managing the namespace, the control applet maintains copies of the entire set of A and B keys that have access to the namespace. The possession of the A and B keys for all the sectors provides the card issuer with the flexibility to dynamically manage the namespace. The dynamic management may be applicable via a remote software application resident on a remote computer, such as a trusted service manager (TSM) in a remote server, the TSM owned or controlled by the card issuer. The wallet software application may also be used to dynamically swap software application and application data in and out of the namespace areas based on various parameters, such as user action and/or location, using the access key provided by the control applet. For example, in a transit system, if the contactless smart card device end-user travels from one location to another, the smart card credentials applicable to the first location transit system is swapped for the second location transit credentials, and the card is available for use in the second location.

To leverage the application directory (AD), the card issuer, in one exemplary embodiment, uses a modified version of an application directory that occupies a specific part of the card block and uses a card issuer defined namespace in the secure element. Further, a card issuer application directory implementation can support the ability to provision directly from the wallet software application (user-interface software application), thereby swapping the contents of a secure element namespace in a dynamic manner without additional external permissions.

In certain exemplary embodiments, the wallet software application may be deployed by the card issuer or the software application provided, where a software application and the control applet within the secure element can collaborate or interact with each other for accessing the namespace without using an intermediary trusted secure manager (TSM) for external authentications. To securely support the provisioning of sensitive data, the control applet supports asymmetric public/private key encryption. The control applet includes both keys in a secure memory within, or external to, the secure element, and will only make the public key available outside of the secure element.

The control applet acts as an extension of the wallet software application on the secure element and supports such features as an EMVCo compliance in the secure element. The control applet can accept commands directly from the wallet software application, thereby supporting two types of storage (SSLOTs and RSLOTs); managing the access keys for RSLOTs and SSLOTs; exporting/rotating of the access keys to second party partners or software application providers for SSLOTs; supporting a public/private key pair so that encrypted instructions may be received from second party devices; provisioning data to the slots where the provisioning is without the TSM or a trusted service agent (TSA) software for provisioning application data, software application, or access keys to the secure element; dynamically swapping of the access keys and data for both SSLOTS and RSLOTs to support over-subscription of the namespace; and implementing a proprietary version of the AD that locates the root AD block in a card issuer's specified location. In certain exemplary embodiments, this can be defined to be at the position directly after the first kilobyte of memory (sector 16) of the smart card.

The card issuer application directory in the namespace can be managed entirely by the card issuer. The control software application also can initialize the keys for the block, while always retaining a copy of A and B keys for all the slots (or sectors) in the namespace. In the case of SSLOTs, the possession of a valid B key may be contractually, as opposed to, technically enforced. In one example, automatic implementation via SLA and business policies from a non-TSM server or agent may be implemented. The wallet software application initiates the provisioning of all instruments to the contactless smart card device, which is an example of "pull provisioning." Further, the wallet software application initiates all non-contactless transactions and can allow push notifications for already provisioned software applications, in which case the wallet software application may subsequently initiate the requested transaction.

Upon installing the control software application on the secure element, the control software application may typically rotate a set of derived keys into the block and saves the keys, thereby defining the secure memory within the secure element namespace. The access keys can be derived using a combination of a master key, a unique identifier (UID), and the secure element CPLC (card production life-cycle data), each provided by the card issuer or manufacturer. The sectors are then partitioned according to the settings of the access keys and the access bits assigned to each sector. The first 1 kilobyte of the block can be reserved for transit and these sectors may be distributed as SSLOTs or rented as RSLOTs. Either way, the reserved portion of the block will be reserved for transit. The next 3 kilobyte of the block on a 4 KB card can be reserved for the card issuer application directory table. The AD root block will reside in the first sector of the block reserved for the application directory.

In certain exemplary embodiments, key rotation may be implemented by the control software application. The control software application may initially be installed in the secure element via the TSM or at the card issuer's manufacturing facilities prior to incorporating within contactless smart card devices. However, the key rotation can occur at instantiation time of the control software application, at the first use of the device. The access key rotation may initiate as part of the instantiation code of the control software applet that is triggered when the contactless smart card device is turned on. In some exemplary embodiments, the control applet can be pre-installed via the card manufacturer's production process whereby it is installed in the ROM or the EEPROM memory section when the semiconductor die leaves the manufacturer's wafer processing (after testing). As part of that process, the instantiation code for the control applet will not be executed thereafter. For this reason, a check for "not yet rotated" can be included once the control applet has been selected for instantiation to ensure that the control applet cannot be used (or selected) without having the access key rotated. A special command that needs disabling is not needed as the check at any time will only execute the access key rotation once. The control applet, in this case, needs to ensure that it secures a possible abort of access key rotation to ensure that all keys have been rotated at least once before the access key rotation feature is disabled for the device.

In certain exemplary embodiments, the access key rotation can be executed as early as the production process of the contactless card and as late as the incorporation and initiating of the various driver software for each component, including the contactless smart card in the contactless smart card device, for example, a mobile phone. Incorporating and initiating of the smart card will ensure that the process of securing (or disabling) the embedded secure element (eSE) is not needed thereafter. Further, the process where the key rotation is performed at the original equipment manufacturer (OEM) at time of production or testing of the card is useful in verifying if the NFC module, containing the NFC controller, PN544, and JCOP, is working correctly. This process ensures that any soldering and die work has not cracked or damaged the chip. The OEM can execute this checking process as a functional test of the semiconductor die. As a result, the OEM can implement a quality check to improve device quality prior to delivery, and the card issuer will have the advantage of the key rotation being done prior to implementing the card issuer's embedded software.

The control software application or the control applet, and the wallet software application (user-interface software application) perform service and provisioning of the secure element namespace and provide a convenient interface to ensure that the software application providers or the card issuer provisions the memory using correct application IDs (AIDs). This action ensures that new software applications do not overwrite the application software or application data of other software applications in the secure element namespace. For the software application providers to interact with the control software application, the card issuer publishes a protocol, which may be in a message format and an associated transaction model. The initiation of provisioning can be driven from the wallet software application by the user. Once a credential has been provisioned for a partner (one of a number of software application providers), the solution provides a callback identifier that the software application provider can use to deliver push notifications to the device.

In certain exemplary embodiments, all control applet transactions can be initiated by the wallet software application, even if a transaction occurs as a consequence of a pushed event notification. The wallet software application can be the initiator of the transaction. In this method, the control software application solution may be different from the traditional EMVCo provisioning in that, in the control software application, the wallet software application is the master and the software applications are slaves of the transaction. Conversely, for EMVCo provisioning, the software application providers (for example, financial institutions or transit systems) are the masters of the transactions, and the wallet software application is the slave without knowledge of even what actions are being performed to it by the software application provider, via the TSM. This design can alleviate the necessity of a TSM, as the control applet in conjunction with the wallet software application, and an asymmetric key-pair cryptography algorithm plays the role of the trusted neutral and secure software application provider. The control software application may additionally define all interactions that will be driven over a secure channel (enforced by at least a secure socket layer or SSL).

In certain exemplary embodiments, a TSM software application (or a TSM applet in the JavaCard VM environment) may independently, or as a part of the control software application, provide TSM implementation in the secure element via the public-private key asymmetric cryptography algorithm that allows for a non-TSM computer to provide public key encrypted software applications and application data, as well as life-cycle controls to the TSM software application in the secure element. The TSM software application provides the control software application or the installed software applications, the required permissions to perform certain software application life-cycle functions, including installation, instantiation, starting, stopping, destroying, updating, activating, de-activating, swapping of sectors and memory blocks, changing of access keys, and changing of access bits for the access conditions, each function performed with intervention from an external TSM computer device. Each of a number of a non-TSM computers, including software applications or application data, registers with the card issuer via the TSM software application or the control software application, where the registration process provides the non-TSM computer with a public key for providing application data to the secure element of the contactless smart card. Further, the TSM software application may then control the lifecycle of the application data within the secure element using permissions granted to the TSM software application as a part of the registration process.

In certain exemplary embodiments, the control software application implementation is performed via a Representative State Transfer (RESTful) interface, which is a stateless client-server architecture, using messages in a defined JavaScript Object Notification or JSON format. The control software application involves transaction in a sequence of events that starts with the wallet software application sending a commence provision message to a partner device, where the partner device may be a non-TSM computer or a TSM computer operating as a remote server host for multiple software applications. The commence message includes the information necessary for the non-TSM computer to encode a 'manage transaction' response that is securely returned to the wallet software application. The partner uses the information in the commence transaction message to encode data in the response message. For example, the commence message can include the public key for the control applet to match with a private key stored in the contactless smart card device.

In certain exemplary embodiments, the non-TSM computer, in turn, uses the public key to encode application data or software application that the non-TSM computer wants to provision into the namespace. A partner device may also be a common non-TSM computer including software applications from multiple software application providers. While the notion of a control applet transaction can be narrow and controlled by design of the commence provision message, it can also be one of many potentially shared APIs between the wallet software application and other software applications within the secure element. In an exemplary embodiment, a specify check balance interface and other functions of a transit system software application can included as part of the software application function. The control software application's message transaction can be one mechanism by which a software application provider may commit data to the secure element from a non-TSM computer. The software application or application data from the non-TSM server may be stored in a part of the secure element assigned for temporary storage, or in an external secure memory area with a secure channel communication to the control software application in the secure element.

In certain exemplary embodiments, an external card reader device with the capability to access SSLOTs within the contactless smart card device may include provisions to function as a TSM computer or a non-TSM computer with the public-private key pair encryption in place. The TSM or non-TSM type card reader can control software applications resident that are identified as being within the card reader's control or were issued by a software application provider with control over both, the card reader and certain software applications within the secure element. When a software application provider wants to initiate a software application related transaction via a card reader device, the relevant non-TSM computer may send a push notification to the wallet software application. In turn, the wallet software application initiates a control software application transaction using the secure communication channel, to verify if the request is deemed valid.

In certain exemplary embodiments, the wallet software application may not offer strong guarantees for receipt or response to notifications within any specific timeframe. The commence provision message structure between the control applet (or TSM applet) and the partner device may comprise the TSM software application or the control software application public key for encryption purposes, the unique ID for the secure element, a protocol version number, a transaction identifier, and an AD A-key to enable access to the AD for partner readers, an event notification that the partner can reference if it was the partner who requested the transaction via a push notification, and a wallet software application callback identifier, so that the partner can push notifications to the wallet at a future date. The provisioning response message can comprise a response status (in other words, SUCCESS, ERROR, RETRY, etc.); a response detail (in other words, if response status is RETRY, then the detail string may say server is down, try again later); an RSLOT/SSLOT Boolean where an AID is required if this is an RSLOT and the AID must be the card issuer application directory ID assigned to software application service provider.

Further, in certain exemplary embodiments, when the SLOT assigned to a software application in the response of a commence provision message is an SSLOT, the AD ID is the valid SSLOT application ID assigned to the partner software application. The response from the software application provider via the card reader or the TSM computer can further comprise the A-key that should be used to protect access to the application data of the selected SLOT or lifecycle functions assigned to the software application, where each is encrypted using the control applet public key. The response area for the public key may be blank if the correct key is already in place at the TSM computer, the TSM software application, or card reader device from where the data to be provisioned. Similarly, the response area for a rotation code may be blank if the transaction is a key rotation type transaction, and existing data is valid; then the B-Key is used in the response when the SLOT is an SSLOT. The SSLOT is encrypted using the control applet public key for rotating the key, while the RSLOT partners cannot rotate the B key. After a transaction with a card reader or TSM computer is completed, a transaction message that the partner would like to share with the user is applied to the contactless smart card and shows up on the user-interface software application (wallet software application), indicating, for example, if the transaction was a top-up of a gift card, where the message could be: "Thanks for topping up your gift card!"

In certain exemplary embodiments, provisioning of the SSLOT initiates when a software application provider and a card issuer enter into a contract ensuring the protection of the B-key and consent to a user-interface software application to be implemented via the wallet software application for interacting with a control software application, thereby controlling certain aspects of the software application from the software application provider. When all agreements are in place, the control software application (combined with the TSM software application) in installed within the secure element of the contactless smart card device. The provisioning of an SSLOT proceeds by securing a user interaction or push notification to trigger a control applet transaction; the wallet software application forms a secure connection channel to the software application partner (software application non-TSM or TSM computer); a commence provision request is sent to the partner encoded as JSON over REST; the partner uses the data in the request to potentially encode data and A+B keys in the response; the wallet software application checks the validity of the response message for correctness and legality (for example, 'StoreA' cannot overwrite the 'StoreB' application); when the response is legal and correct, the wallet software application packages the application data payload into a control applet command; the command then sent to the control applet over a locally secured channel (secured using session ID, SSL, and binary app signing+card OS security); the control applet using the private key to decodes the data payload and keys in the incoming control applet command; the control applet performs key management diversifying and saving the A+B keys as necessary; and the control applet writes the data payload into the correct location specified by the SSLOT application ID (AID).

The provisioning of an RSLOT proceeds in the same fashion as the SSLOT provisioning described previously with the following exceptions: An RSLOT partner can only specify an A-key to be diversified and the RSLOT partner must use an RSLOT or card issuer directory application ID for their application. Since the control applet maintains knowledge of all the keys for the namespace at all times, it is capable of oversubscribing access to the block. The control applet, for example, could allow two transit authorities who use the entire 1 KB of SSLOT space to co-exist in the block. This action is implemented by using user provisioned areas for both a first city transit card and a second city transit card into their wallet. The control applet copies the different applets into and out of the secure element dynamically at the request of the user or based on GPS location of the device hosting the contactless card. When the data for one transit agency is rotated out of the block, the control applet stores the "standby" data in the secure element. When it is necessary to re-enable the standby card, the control applet swaps the standby data into the live block and stores the replaced data. This process can be applied to the RSLOTS as well.

In certain exemplary embodiments, a local trusted service manager (TSM) can be implemented using the asymmetric cryptography method, where the TSM applet exists within the secure element of the smart card and the TSM applet stores a private key to decrypt a public key encrypted application data set from a non-TSM server. The corresponding public key is signed and authorized by the card issuer or a software application provider with the same signed certificates. This process allows the contactless smart card to interact with external card reader devices and to secure a script for software applications and application data without the TSM or a TSA requirement. By way of example, the implementation uses a wallet software application, where the wallet software application sends a certificate to the owner of the application data (software application provider). The wallet software application and application data may include a bank seeking to provision account information in a secure element, a transit agency seeking to provision or change balance information, or a merchant wishing to provision or change gift card, loyalty card, coupons, or other information. The application data issuer examines certificates, validates the signature from the wallet software application, and encrypts the application data with a public key specific to the end-user's contactless smart card device that requested the application data. The application data provider (software application provider) then sends the encrypted data to the local TSM applet (or the control applet, when combined), within the secure element of the end-user's contactless smart card device which incorporates the contactless smart card.

In certain exemplary embodiments, the data path for this encrypted message including the application data can be through the wallet software application (similar to the control applet) using secure communication channels or directly to the control applet. The local TSM applet receives the requested data, verifies the format, verifies the permissions, and performs any other checks to authenticate the application data. Thereafter, the local TSM applet decrypts the application data and installs it to the secure element. In the case of the control applet implementing the local TSM, the received data is decrypted, verified, and installed directly using the contactless card's APIs. In certain exemplary embodiments, the local TSM applet creates a secure script that uses the contactless smart card device's access keys to install the application data. The downloaded application data in encrypted format may be stored in a temporary memory in the secure element or outside the secure element with secure channel connection to the secure element. Further, the secure script is exported from the secure element and executed within the contactless smart card device by a native software application running in the host operating system. In certain exemplary embodiments, the application data from the software application provider is never exposed outside the TSM software application and the contactless smart card device, and similar to the TSM computer, is secure without interacting with a external TSM computer.

The combination of a local TSM applet and the RSLOT implementation using a control applet allows the contactless smart card device to receive and install card information securely from a non-TSM computer. This process can prevent the software application provider from actively managing the lifecycle of this data. The data can be swapped, enabled, and displayed within the secure element of the contactless smart card by using the secure channel and user preferences from a wallet software application can be deployed with permission from the TSM applet without contacting an external TSM computer.

FIG. 1 illustrates a computer-implemented system 100 and device 144 for partitioning the namespace of a secure element in contactless smart card devices and for writing application data in the secure element using requests from a software application outside the secure element according to certain exemplary embodiments. Contactless smart card device 144 includes secure element 156, where the secure element is part of the contactless smart card, either as an internal component or an external component with a secure channel connection each of the other components of the contactless smart card. The other components of the contactless smart card include the NFC controller 176 and the antenna 180. The secure element 156 may be a part of a SIM card, a UICC card, an integrated circuit chip of a CDMA contactless payment device, or an SD card. The external secure element and secure memory 184 is illustrated to provide an example of a temporary, but secure memory connected to the secure element, for software applications to be temporarily placed prior to installation, or during de-activation, to free space in the secure element sectors.

The secure element 156 includes the control software application 160, the secure element namespace 164, which holds the application data and the software applications for transaction purposes. A temporary memory 168 may be incorporated into a section of the existing sectors of the secure element namespace, or in a different partition of the secure element namespace. The temporary memory 168 also may be used in lieu of the external secure element 184. The downloaded application data or software application 172, as well as de-activated software applications, may reside within the temporary memory 168. The NFC controller 176 is triggered via changes made at the control software application or within the sectors of the secure element namespace. Alternatively, if the contactless smart card device is set to passively transmit a radio signal for a reader terminal 188, the NFC controller may remain active when the phone is switched off to enable this passive application of the contactless smart card device 144.

In certain exemplary embodiments, the user-interface software application 152 is the wallet software application that executes within the operating system or the virtual machine environment 148 of the contactless smart card device 144. The user-interface software application 152 provides information to the end-user and accepts information from the end-user via a keypad, voice, or a touch sensitive method. Each of the contactless smart card components may communicate with the secure element or external secure memory. The contactless smart card device 144 communicates with the card issuer 104 and the software application providers 112, using one of the wireless radio communication methods 140 or wireless internet network (Wi-Fi) 196. In certain exemplary embodiments, the card issuer 104 may be the wireless service provider 136. The two components 104 and 136 illustrated in FIG. 1 may then be combined to host the trusted service manager 108, which is illustrated as being resident on the card issuer's 104 side. Software application providers 112 may include credit card companies 116, ticketing companies (transit systems) 120, coupon companies 124, authentication companies (loyalty, membership, and security authentication) 128, and a protected information provider 121, such as a bank, merchant, or other financial service provider, for providing confidential or otherwise protected information (for example, account information), which may be used to instantiate a particular card. Each component 116-128 may include independent secure computers hosting application data and software applications which may be provided to the contactless smart card device 144 directly using connection 196 or indirectly through 136 and 140.

In certain exemplary embodiments, the software application providers 112 provide software applications for transaction purposes to the card issuer 104 for hosting in the TSM computer 108. The software applications may provide secure download capabilities via a secure Wi-Fi connection 196, but to make use of wireless mobile communication's security features, the TSM 108 is used to deploy software applications. In certain secure element applications, the process of installation application data or software applications uses signed certificates that are tracked from the TSM 108 to the secure element 156; accordingly, installation to the secure element may not apply to the Wi-Fi channel 196 and in such circumstances, it may be preferred to use the GSM/CDMA wireless channel 140.

Figure 2:
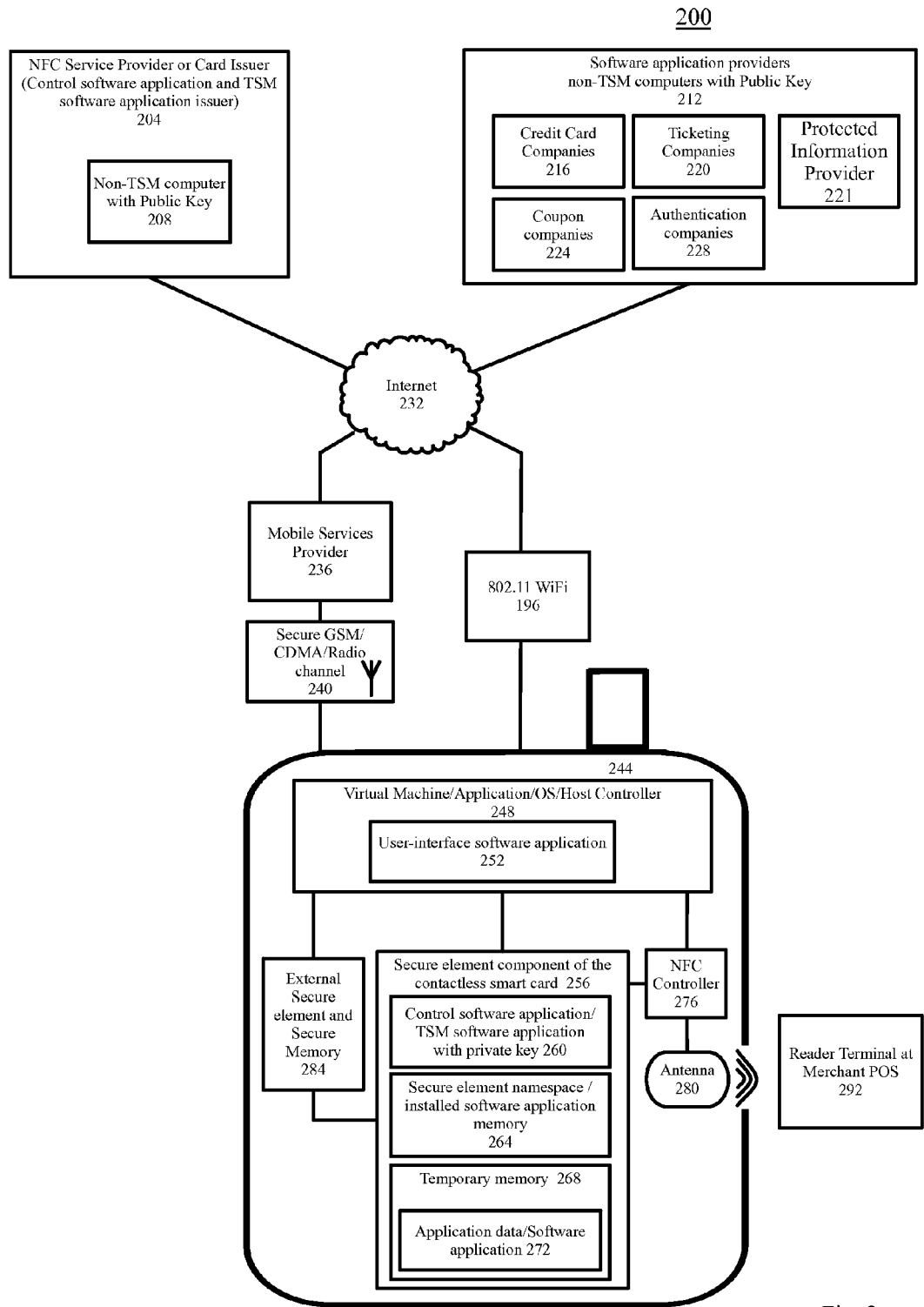
FIG. 2 illustrates a computer-implemented system and device for partitioning the namespace of a secure element in contactless smart card devices and for writing application data in the secure element using requests from a software application outside the secure element according to certain exemplary embodiments.

FIG. 2 illustrates a computer-implemented system 200 and device 244 for partitioning the namespace of a secure element in contactless smart card devices and for writing application data in the secure element using requests from a software application outside the secure element according to certain exemplary embodiments. Contactless smart card device 244 includes secure element 256, where the secure element is part of the contactless smart card, either as an internal component or an external component with a secure channel connection each of the other components of the contactless smart card. The other components of the contactless smart card include the NFC controller 276 and the antenna 280. The secure element 256 may be a part of a SIM card, a UICC card, an integrated circuit chip of a CDMA contactless payment device, or an SD card. The external secure element and secure memory 284 is illustrated to provide an example of a temporary, but secure memory connected to the secure element, for software applications to be temporarily placed prior to installation, or during de-activation, to free space in the secure element sectors.

The secure element 256 includes the control software application or a TSM software application 260, as well as the secure element namespace 264, which holds the application data and the software applications for transaction purposes. A temporary memory 268 may be incorporated into a section of the existing sectors of the secure element namespace, or in a different partition of the secure element namespace. The temporary memory 268 also may be used in lieu of the external secure element 284. The downloaded application data or software application 272, as well as de-activated software applications may reside within the temporary memory 268. The NFC controller 276 is triggered via changes made at the control software application or within the sectors of the secure element namespace. Alternatively, if the contactless smart card device is set to passively transmit a radio signal for a reader terminal 292, the NFC controller may remain active when the phone is switched off to enable this passive application of the contactless smart card device 244.

In certain exemplary embodiments, the user-interface software application 252 is the wallet software application that executes within the operating system or the virtual machine environment 248 of the contactless smart card device 244. The user-interface software application 252 provides information to the end-user and accepts information from the end-user via a keypad, voice, or a touch sensitive method. Each of the contactless smart card components may communicate with the secure element or external secure memory. The contactless smart card device 244 communicates with the card issuer 204 and the software application providers 212, using one of the wireless radio communication methods 240 or wireless internet network (Wi-Fi) 296. In certain exemplary embodiments, the card issuer 204 may be the wireless service provider 236. The two components 204 and 236 illustrated in FIG. 2 may then be combined to host the a computer capable of deploying software applications via a public key, where the computer is a non-TSM computer 208, which is illustrated as being resident on the card issuer's 204 side. Software application providers 212 may include credit card companies 216, ticketing companies (transit systems) 220, coupon companies 224, authentication companies (loyalty, membership, and security authentication) 228, and a protected information provider 221, such as a bank, merchant, or other financial service provider, for providing confidential or otherwise protected information (for example, account information), which may be used to instantiate a particular card. Each component 216-228 may include independent secure computers hosting application data and software applications which may be provided to the contactless smart card device 244 directly using connection 296 or indirectly through 236 and 240.

In certain exemplary embodiments, the control software application or the TSM software application access a private key stored in the temporary memory 268. In an exemplary embodiment, the private key is generated by the card issuer using an asymmetric cryptography algorithm. The private key may be changed and pushed from the card issuer 204 to the secure element 256 at pre-determined intervals to keep the private key rotated and secure. Further, the TSM software application may be integrated into the control software application, thereby enabling the two software applications to control the transaction software applications from the software application providers. The public key generated by the cryptography algorithm is then distributed to a variety of legal software application providers, including providers 216-228 and the software applications hosted by the non-TSM computer 208. The use of the asymmetric cryptography algorithm provides a benefit to the system 200, where a remote TSM is not required for minor permissions for software applications, including instantiation, stopping, starting, and destroying of the software application.

The permissions may be granted via the TSM software application 260, which includes the private key to decrypt and authenticate software applications from non-TSM computers 208 and 216-228. Further, the TSM software application may authenticate requests for changes to be performed on installed software applications within the secure element, thereby eliminating the secure element runtime environment from calling APIs for seeking permissions for software applications in terms of lifecycle functions.

FIG. 3 illustrates a data structure 300A for the namespace of a secure element 304 in contactless smart card devices and the application data 300B associated with the control software application 300 which controls the partitioning and storage of application data in the secure element namespace according to certain exemplary embodiments. The secure element namespace is illustrated as a table in FIG. 3 which includes 16 bytes per memory block 316 and 4 blocks 312 per sector 308. Each memory block includes access memory blocks 328A-Z, and data memory blocks 332. Each access memory block 328A-Z further includes access keys 320 and 324, where each of the A keys 320A-Z and the B key 324A-Z provides one, or a combination of two or more access types to the entire block. The access memory blocks 328 include access bits describing the access type assigned to the blocks in the sector. The manufacturer's block 336 includes version information and unique identifier information for deriving the default access keys A and B. The data memory block for sector 0 also includes an application directory in block 1 and block 2 of sector 0. The application directory 332A is a table with AID information and pointers to the sector including the software application or application data underlying the AID.

The control software application 340 is shown for illustrative purposes as including the application data, but in certain exemplary embodiments, the application data is stored in data memory blocks of the same secure element namespace 304 or a physically or virtually different secure element outside the secure element 304. The control software application 340 stores all the access keys 344, including access keys for changing the B key and the access bits 348 for each of the sectors in the secure element namespace 304. The sector type 352 is defined according to the access bits stored in the control software application, where the sector type allows a single software application to perform certain functions within the sector—for example, write, read, increment, decrement, and a directory sector type. Further, the sector type associates with the slot selection and distribution made by the card issuer via the control software application. The read/write blocks may be assigned SSLOT sectors, while the initial value in sector 15 can only be written when transaction type software application has control of the sector, and is therefore an SSLOT owner. When a software application is stored across multiple sectors, the AID per sector is stored 356 in the control software application for following the structure of software applications in the contactless smart card. A change log logs end-user requests, changes made by an external TSM computer and requests for access keys made by external card readers during the lifecycle of a software application in the secure element.

Figure 4:
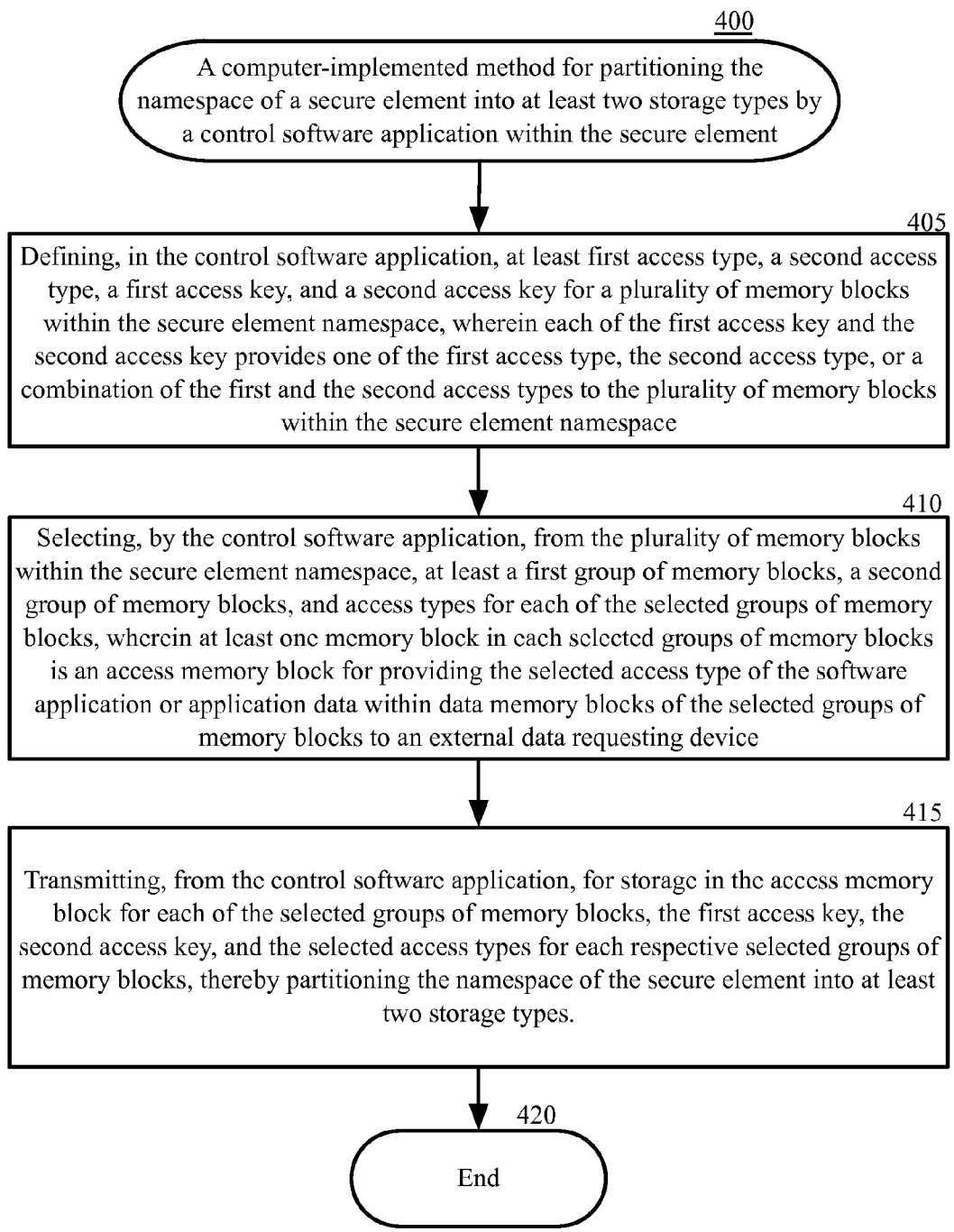
FIG. 4 illustrates a computer-implemented method for partitioning the namespace of a secure element into at least two storage types by a control software application within the secure element according to certain exemplary embodiments.

FIG. 4 illustrates a computer-implemented method 400 for partitioning the namespace of a secure element into at least two storage types by a control software application within the secure element according to certain exemplary embodiments. In block 405, a card issuer or the contactless smart card device end-user defines access types, for example, a first access type, a second access type, a first access key, and a second access key, for a number of memory blocks within the secure element namespace. Each of the first access key and the second access key provides one of the first access type, the second access type, or a combination of the first and the second access types to the plurality of memory blocks within the secure element namespace. The control software application may be used to define the access types and access keys, where, in an alternate embodiment, the definition may be performed after production, during the rotation of the access keys as described above. Access keys include the A key and B key, and access types include write, read, increment, decrement, and restore or default.

Block 410 performs a selection process using the control software application to select from the memory blocks within the secure element namespace, at least a first group of memory blocks, a second group of memory blocks, and access types for each of the selected groups of memory blocks. At least one of the memory blocks in each selected groups of memory blocks is an access memory block for providing the selected access type for the software application or application data within data memory blocks of the selected groups of memory blocks to an external data requesting device Block 415 performs a transmitting function to transmit, from the control software application, for storage in the access memory block for each of the selected groups of memory blocks, the first access key, the second access key, and the selected access types for each respective selected groups of memory blocks, thereby partitioning the namespace of the secure element into at least two storage types.

Figure 5:
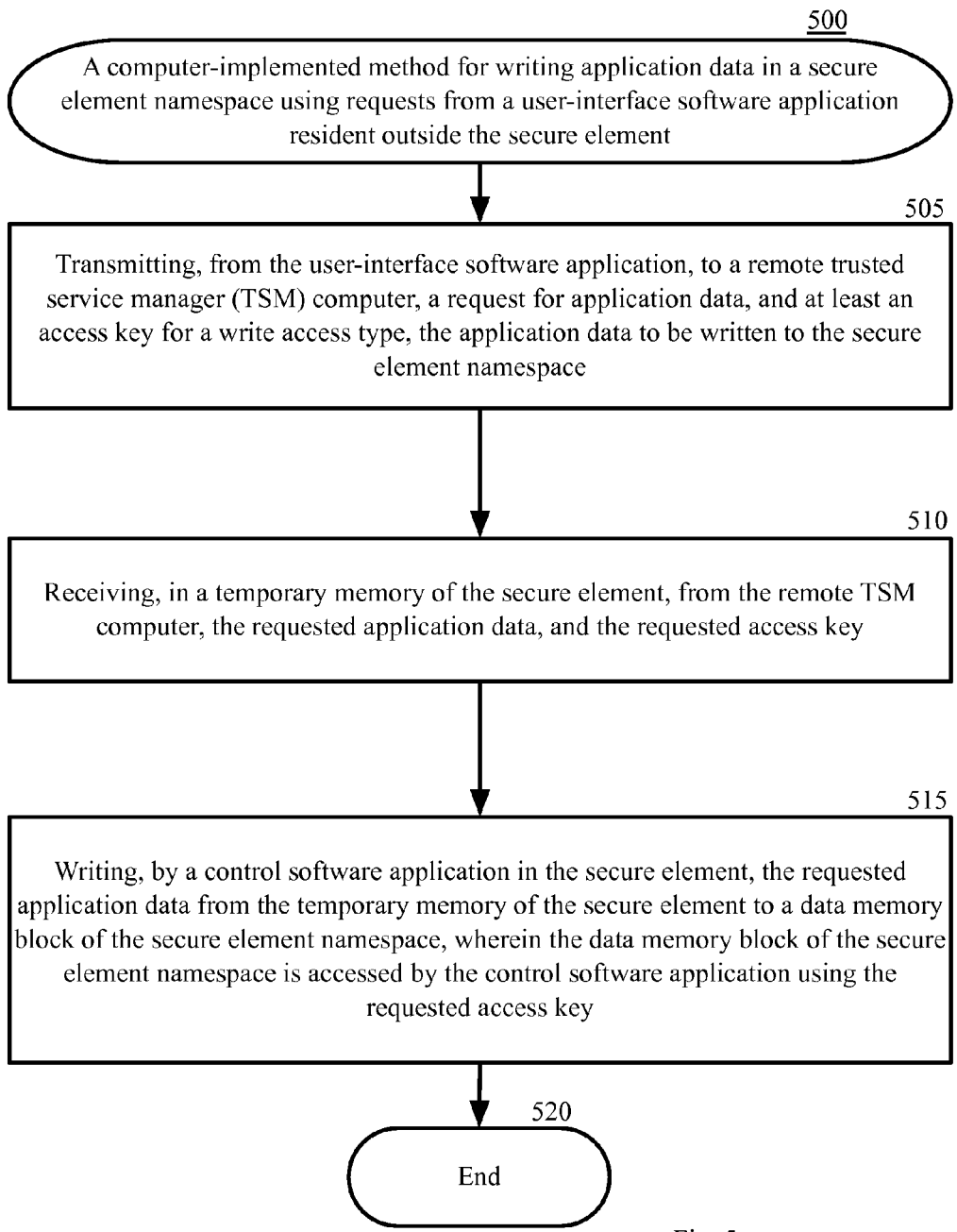
FIG. 5 illustrates a computer-implemented method for writing application data in a secure element namespace using requests from a user-interface software application resident outside the secure element according to certain exemplary embodiments.

FIG. 5 illustrates a computer-implemented method 500 for writing application data in a secure element namespace using requests from a user-interface software application resident outside the secure element according to certain exemplary embodiments. Block 505 performs an initial transmitting function, from the user-interface software application or the wallet software application, to a remote trusted service manager (TSM) computer, a request for application data, and at least an access key for a write access type. The application data requested via block 505 is to be written to the secure element namespace.

Block 510 performs a receiving step, receiving the requested application data, and the requested access key at a temporary memory of the secure element, from the remote TSM computer. As discussed above, the temporary memory may be physically or virtually different for the secure element used for storing application data and software applications for transaction purposes. For example, the temporary memory may be the external secure memory 184, 284 or the temporary memory 168, 268. Block 515 uses the control software application in the secure element to write the requested application data from the temporary memory of the secure element to a data memory block of the secure element namespace. The data memory block is pre-determined or assigned by the control software application. Further, the data memory block of the secure element namespace is accessed by the control software application using the requested access key received from the TSM computer.

Figure 6:
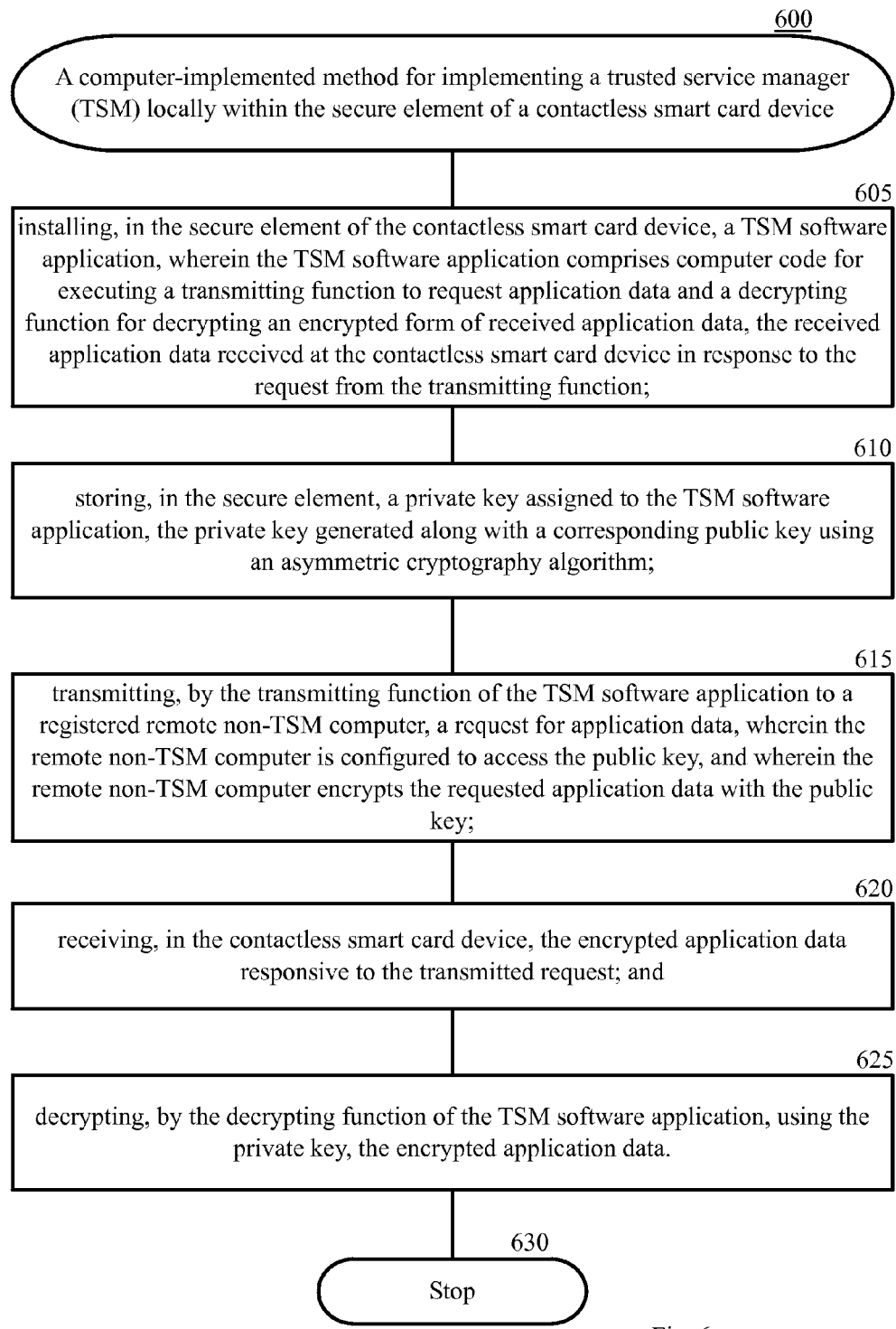
FIG. 6 illustrates a computer-implemented method for implementing a trusted service manager (TSM) locally within the secure element of a contactless smart card device according to certain exemplary embodiments.

FIG. 6 illustrates a computer-implemented method 600 for implementing a trusted service manager (TSM) locally within the secure element of a contactless smart card device according to certain exemplary embodiments. A TSM software application is installed by block 605 in the secure element of the contactless smart card device. Block 605 may represent a step right after the rotation of the key at manufacture of the contactless smart card, or prior to deployment of the contactless smart card in the contactless smart card device. The TSM software application may be incorporated within the control software application of the secure element, or may be executed independently. The TSM software application includes computer code for executing a transmitting function to request application data and a decrypting function for decrypting an encrypted form of received application data, where the received application data is received at the contactless smart card device in response to the request from the transmitting function.

Block 610 stores a private key in the secure element, where the private key is assigned to the TSM software application, where the private key is generated along with a public key using, for example, an asymmetric cryptography algorithm.

A transmitting step follows via block 615 for transmitting by the TSM software application to one of a number of registered remote non-TSM computers, a request for application data. These non-TSM computers include devices 208 and 216-228 of FIG. 2. The remote non-TSM computer is configured to access the public key for encrypting the application data responsive to the request. The TSM software application also can transmit a request for application data to a TSM computer, which may use the public key to return data to the device 244.

Block 620 performs a receiving function in the contactless smart card device, where the encrypted application data is received and stored. The encrypted application data may be stored in a temporary memory within the secure element sectors assigned for the purpose, or via an external secure memory belonging to contactless smart card device, where the external secure memory is connected to the secure element via a secure communication channel. Application data providers may encrypt the requested application data using the public key and then communicate the encrypted data to the device 244 for receipt in block 620.

Block 625 decrypts the encrypted application data using the private key assigned to the TSM software application. The decrypted application data is ready for installation within a pre-determined data memory block of the secure element, where the data memory block allocation is decided by the control software application based on the current status of the memory blocks, the access bits assigned to the memory blocks, and the state of the sector—SSLOT or RSLOT.

In an exemplary embodiment, the secure element 256 can have assigned thereto a unique private key and corresponding public key. When the TSM software application is first installed, it can generate two public/private key pairs and save these key pairs internally. One key pair is used for receiving encrypted communication as described with reference to FIG. 6, and the other key pair is used to allow the TSM software application to sign messages.

A trusted entity, such as a remote trusted service manager, can contact the TSM software application to obtain the public keys and to create certificates that allow third parties to verify that these public keys are indeed associated with the TSM software application in a real secure element. These third parties, for example, the devices 208 and 216-228 of FIG. 2, then can encrypt messages using the public key for encryption, send the encrypted messages to the secure element 256, and verify that messages they receive originated with secure element 256.

Invocation of the decryption function of the TSM software application, using the private key for decryption, can only be called by other applications installed in the secure element 256. Certificates can be created based on the public/private key pairs to vouch for the security of the public keys.

FIG. 7 illustrates a computer-implemented method 700 of controlling access to the secure element namespace for partitioning and provisioning purposes, the access conditions 704, access types 708-712, and access keys, for example, 720 and 724 that many be assigned to memory blocks within various sectors of a contactless smart card according to certain exemplary embodiments. For the sector or memory block listed in column 716, the type of change that may be implemented via the control software application is defined by the access conditions 704. The control software application stores the access condition information along with the table 300B illustrated in FIG. 3. The read access type in the first row is set to Key $A_1$ which implies that the related sector 728 may be read by an external card reader device capable of displaying the same Key $A_1$ to the contactless smart card. Similarly, Key $A_1$ or $B_1$ may be used to access the writing capabilities to the sector defined by the access condition in 728. By way of an example, using the transit system, for a sector that has access bits, in the access memory block for allowing exit and entry data input, the external card reader provides the smart card with the B key to the particular sector for writing the exit and entry stations. Initial value changes may be made at sector 740 using key $B_2$ which may be different from key $B_1$. A card reader at a turnstile may not access this sector, and a special reader at the transit office may provide access to this sector for adding value to the contactless smart card.

The access keys themselves may be changed in certain circumstances, but in the embodiments described herein, the control software application logs and permits changes to the B key based on the contractual obligation between the card issuer and the software application provider. Accordingly, as illustrated in FIG. 7, Key $A_2$ 752 may be changed using the same key $A_2$ or the high privileged key, key $B_2$ to first access and change the access keys in the access memory block of the sector. Key $B_2$ is always a higher security key and can be used to perform the access key changes to Key $A_2$ and key $B_2$ of a selected sector, as illustrated via 744-764. The B key may not be changed with the A key even though the converse may work for select sectors. Finally, access bits in the access memory block may be changed 776, thereby assigning the memory block different privileges for RSLOT and SSLOT purposes. Further, software applications in the memory blocks may be read out and stored in different memory blocks prior to changing the access keys or the access bits. The application data or software applications may then be written back to a new or the original memory blocks after the access keys and bits have been changed. For an RSLOT, by way of an example, memory sectors 728 and 740 may need to be SSLOTs to allow a transit authority to add values to the data within these slots. However, the access bits in the access memory block may not be an SSLOT, and may instead be an RSLOT, thereby allowing the transit authority to change access conditions, from increment to decrement without changing keys in the block.

One or more aspects of the disclosure may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the disclosure in computer programming, and the disclosure should not be construed as limited to any one set of computer program instructions. Further, a skilled programmer would be able to write such a computer program to implement an embodiment of the disclosed disclosure based on the appended flow charts and associated description in the application text. Therefore, disclosure of a particular set of program code instructions is not considered necessary for an adequate understanding of how to make and use the disclosure. The inventive functionality of the disclosure will be explained in more detail in the following description of exemplary embodiments, read in conjunction with the figures illustrating the program flow.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the disclosure. Accordingly, such alternative embodiments are included in the disclosures described herein.

The exemplary embodiments can be used with computer hardware and software that perform the methods and processing functions described above. As will be appreciated by those having ordinary skill in that art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

What is claimed is:

1. A computer-implemented method for writing application data in a secure element namespace of a secure element of a contactless device, using requests from a user-interface software application resident on the contactless device and outside the secure element, the method comprising:
    assigning, by a control software application in the secure element, one or more memory blocks of the secure element namespace to a software application from a software application provider, wherein the one or more data memory blocks of the secure element namespace are protected from a read access type and a write access type access keys, the access keys defined, by the control software application, in an access memory lock of the secure element namespace, and wherein a copy of the access keys are maintained in the control software application;
    transmitting, from the user-interface software application to a remote trusted service manager (TSM) computer, a request for application data for the software application assigned to the one or more memory blocks of the secure element and an access key for a write access type, the application data to be written to the secure element namespace;
    receiving, in a secure memory of the contactless device, from the remote TSM computer, the requested application data and the requested access key; and
    writing, by the control software application in the secure element, the requested application data from the secure memory to the one or more data memory blocks of the secure element namespace to the software application, wherein the one or more data memory blocks of the secure element namespace are accessed by the control software application using the requested access key.

2. The method according to claim 1, wherein the requested application data comprises at least one of a software application executable in the secure element or data required to support an existing software application in the secure element.

3. The method according to claim 2, further comprising:
    receiving, in the secure memory from the remote TSM computer, an application identifier (AID) for the software application and a directory access key, the directory access key for writing to an application directory table in a directory memory block in the secure element namespace; and
    writing, by the control software application, the AID of the software application and the memory block location of the written software application into the application directory table, wherein the directory memory block is accessed by the control software application using the directory access key.

4. The method according to claim 1, further comprising:
    receiving, in the secure memory, from the remote TSM computer, a new access key, wherein the new access key overwrites the requested access key; and
    replacing, by the control software application, in the access memory block the requested access key with the new access key, wherein write access to the data memory block and the access memory block are granted using the requested access key, and wherein a copy of the new access key is maintained in the control software application.

5. The method according to claim 1, wherein the secure element comprises the secure memory.

6. The method according to claim 1, wherein the user-interface software application resident outside the secure element executes on an operating system of a computer, the computer comprising the secure element and an input device for accepting a user input.

7. The method according to claim 1, wherein writing the requested application data from the secure memory to a data memory block comprises an installation step when the application data is a software application, thereby configuring the software application to execute within the secure element for initiating transactions with an external card reader device.

8. The method according to claim 1, wherein the TSM computer is an external card reader device in radio frequency contact with the contactless device comprising the secure element.

9. A computer-implemented system for writing application data in a secure element namespace of a contactless device using requests from a user-interface software application resident outside the secure element, the system comprising:
    a computer comprising the secure element and that executes a user-interface software application to transmit, to a remote trusted service manager (TSM) computer, a request for application data and an access key for a write access type, the application data to be written to the secure element namespace;
    a temporary memory in the computer for receiving, from the remote TSM computer, the requested application data and the requested access key; and
    a control software application operating in the secure element that assigns one or more memory blocks of the secure element namespace to a software application from a software application provider, and that writes the requested application data from the temporary memory to the one or more data memory blocks of the secure element namespace assigned to the software application,
    wherein the one or more data memory blocks of the secure element namespace are accessed by the control software application using the requested access key.

10. The system according to claim 9, wherein the secure element comprises the temporary memory.

11. The system according to claim 9, wherein the data memory blocks of the secure element namespace are protected from a read access type and a write access type by access keys, the access keys defined in an access memory block of the secure element namespace.

12. The system of claim 11, wherein the control software application maintains a copy of the access keys defined in the access memory blocks of the secure element namespace.

13. The system according to claim 9, wherein the requested application data comprises at least one of a software application executable in the secure element or data required to support an existing software application in the secure element.

14. The system according to claim 13, wherein the temporary memory receives from the remote TSM computer an application identifier (AID) for the software application and a directory access key, the directory access key for writing to an application directory table in a directory memory block in the secure element namespace, and wherein the control software application in the secure element writes the AID of the software application and the memory block location of the written software application into the application directory table, wherein the directory memory block is accessed by the control software application using the directory access key.

15. The system according to claim 9, wherein the temporary memory receives, from the remote TSM computer, a new access key, the new access key replaces the requested access key, and wherein the control software application in the secure element replaces in the access memory block the requested access key with the new access key, wherein write access to the data memory block and the access memory block is granted using the requested access key, and wherein a copy of the new access key is maintained in the control software application.

16. The system according to claim 9, wherein writing the requested application data from the temporary memory to a data memory block comprises an installation step when the application data is a software application, thereby configuring the software application to execute within the secure element for initiating transactions with an external card reader device.

17. The system according to claim 9, wherein the TSM computer is an external card reader device in radio frequency contact with the computer.

18. A contactless device, comprising:
- a secure element comprising a secure element namespace;
- a user-interface software application resident outside the secure element that transmits, to a remote trusted service manager (TSM) computer, a request for application data and at least an access key for a write access type, the application data to be written to the secure element namespace;
- a temporary memory that receives, from the remote TSM computer, the requested application data and the requested access key; and
- a control software application in the secure element that assigns one or more data memory blocks of the secure element namespace to a software application from a software application provider, and that writes the requested application data from the temporary memory to the one or more data memory blocks of the secure element namespace assigned to the software application, and wherein the one or more data memory blocks of the secure element namespace are accessed by the control software application using the requested access key.

19. The device according to claim 18, wherein the secure element comprises the temporary memory.

20. The device according to claim 18, wherein the data memory blocks of the secure element namespace are protected from a read access type and a write access type by access keys, the access keys defined in an access memory block of the secure element namespace.

21. The device of claim 20, wherein the control software application maintains a copy of the access keys defined in the access memory blocks of the secure element namespace.

22. The device according to claim 18, wherein the requested application data comprises at least one of a software application executable in the secure element or data required to support an existing software application in the secure element.

23. The device according to claim 22, wherein the temporary memory receives, from the remote TSM computer, an application identifier (AID) for the software application and a directory access key, the directory access key for writing to an application directory table in a directory memory block in the secure element namespace, and wherein the control software application in the secure element writes the AID of the software application and the memory block location of the written software application into the application directory table, wherein the directory memory block is accessed by the control software application using the directory access key.

24. The device according to claim 18, wherein the temporary memory receives, from the remote TSM computer, a new access key, wherein the new access key replaces the requested access key, and wherein the control software application replaces in the access memory block the requested access key with the new access key, wherein write access to the data memory block and the access memory block has been granted using the requested access key, and wherein a copy of the new access key is maintained in the control software application.

25. The device according to claim 18, wherein writing the requested application data from the temporary memory to a data memory block comprises an installation step when the application data is a software application, thereby configuring the software application to execute within the secure element for initiating transactions with an external card reader device.

26. The device according to claim 18, wherein the TSM computer is an external card reader device in radio frequency contact with the device.

\* \* \* \* \*

UNITED STATES PATENT AND TRADEMARK OFFICE
CERTIFICATE OF CORRECTION

| | | |
|---|---|---|
| PATENT NO. | : 8,335,921 B2 | Page 1 of 1 |
| APPLICATION NO. | : 13/244767 | |
| DATED | : December 18, 2012 | |
| INVENTOR(S) | : Rob von Behren et al. | |

It is certified that error appears in the above-identified patent and that said Letters Patent is hereby corrected as shown below:

On the Title Page:

Item (73) Assignee; correct assignee name should be

Google Inc.

Signed and Sealed this
Nineteenth Day of February, 2013

Teresa Stanek Rea
*Acting Director of the United States Patent and Trademark Office*